United States Patent Office 2,943,942
Patented July 5, 1960

2,943,942

FOAMING BEVERAGES

Edward Segel, Chicago, Ill., assignor to J. E. Siebel Sons' Company, Inc., Chicago, Ill., a corporation of Illinois No Drawing. Filed Mar. 18, 1959, Ser. No. 800,077

6 Claims. (Cl. 99—48)

This invention relates to the improvement of foam in carbonated alcoholic beverages derived from malt.

More specifically, it relates to the improvement of foam in beverages such as beer, ale, and so-called "near beer." In the present specification, the word "beer" is used to include the entire class of carbonated alcoholic malt beverages.

When a carbonated alcoholic malt beverage, as beer, is poured into a glass, a head of foam forms which gradually subsides. This head of foam has aesthetic appeal to the consumer. It is highly desirable that the foam be long-lived and attractive in appearance.

Variation in foam life is found not only among different brands of beer, but in different batches of beer made by the same brewery. One of the aims of a brewery is to produce consistently a beer which gives a long lasting head of foam. This goal is not easy to attain.

An object of this invention is to increase foam life in any carbonated malt beverage.

Another object of this invention is to produce a beer more pleasing to the consumer, in that the head of foam formed when the beer is poured into a glass is more attractive in appearance and collapses more slowly.

Other objects of this invention will appear hereinafter.

I have discovered that phosphorylated mannan, a high molecular weight, exocellular, phosphorylated polysaccharide produced by the yeast Hansenula holstii (most especially by the strain designated as NRRL Y-2448, Northern Research Laboratory Classification), has a profoundly beneficial effect on the stability of beer foam.

As described in the bulletins of September 5, 1958, and CA-N-7 October 1958 of the Northern Utilization and Research Division of the U.S. Dept. of Agriculture, Agricultural Research Service, this compound, also designated as phosphomannan Y-2448, can be made by whole culture fermentation with the above described yeast under aerobic conditions for 96 hours at 28° C. in a medium containing 6% glucose, organic nitrogen sources, potassium dihydrogen phosphate, and trace elements. The mixture is then supercentrifuged to remove cells, crude phosphorylated mannan is precipitated from the supernatant liquid by methanol in the presence of electrolyte such as potassium chloride, reprecipitated, and finally the desired product is dehydrated by adding an aqueous solution to methanol.

The recovered product, phosphorylated mannan, is a white powder, readily soluble in cold water. It may be introduced into beer either as an aqueous solution, or the solid may be dissolved directly in the beer during manufacture.

The addition of phosphorylated mannan to beer in very small amounts markedly increases the time which elapses between pouring the beverage into a glass and the disappearance of the foam so formed.

To determine the foam life of beer, the time required for collapse of the head of foam on a glass of beer is measured under standardized conditions. Reproducible results for a given beer are obtained by control over the distance through which the beer falls when poured, the time required for pouring a standard volume, and the temperature of the beer when poured. Comparisons of collapse times of beers with and without added phosphorylated mannan show the remarkable stability imparted to beer foam by phosphorylated mannan.

The effect of phosphorylated mannan on beer is remarkably consistent. The degree of increase in foam life will depend in part on the concentration of phosphorylated mannan in the beer, as well as to some extent on the particular beer used. One skilled in the art can readily select a concentration for a particular beer which will give an increase large enough to be pleasing to the consumer, yet not so large as to give an unnatural looking foam.

For most purposes, the desired concentration of phosphorylated mannan in beer lies in the range of 20-80 parts per million. However, noticeable improvement in beer foam stability can be observed at as low a concentration as 5 p.p.m. For special purposes, higher concentrations, such as up to about 320 p.p.m., may be desirable, though usually the increase in foam stability at 80 p.p.m. is sufficiently great that no advantage is obtained by the use of higher concentrations.

Addition of phosphorylated mannan to beer does not impair the stability, taste, potability, or brilliance of the beverage.

While phosphorylated mannan may be added in beer manufacture during fermentation or even to the wort prior to fermentation, I prefer to add it after the completion of fermentation, to avoid loss of material by adsorption or absorption by the yeast or other solid material.

The following examples illustrate the use of phosphorylated mannan in carbonated beverages, but in no way limit the invention.

*Example I*

An 0.67% aqueous solution of phosphorylated mannan was added to finished beer A in varying amounts. The final concentrations of phosphorylated mannan were either 20, 40, or 80 p.p.m. The beer containing 20 p.p.m. had a foam collapse time of 6 minutes 2 seconds, that containing 40 p.p.m. collapsed in 8 minutes 19 seconds, while the foam of the beer having 80 p.p.m. had not collapsed in 10 minutes. The same beer under identical conditions but without the addition of phosphorylated mannan had a collapse time of 5 minutes 29 seconds.

*Example II*

An 0.67% aqueous solution of phosphorylated mannan was added to finished beer B. The final concentration of phosphorylated mannan was 5 p.p.m. This beer had a foam collapse time of 5 minutes 33 seconds. The same beer under identical conditions but without the addition of phosphorylated mannan had a collapse time of 5 minutes.

*Example III*

Solid phosphorylated mannan was added to finished beer C and allowed to dissolve. The final concentration of phosphorylated mannan was 320 p.p.m. This beer had a foam collapse time of 9 minutes. The same beer under identical conditions but without the addition of phosphorylated mannan had a collapse time of 5 minutes.

*Example IV*

An 0.67% aqueous solution of phosphorylated mannan was added to prefiltration beer D. The concentration of phosphorylated mannan in the beer was 80 p.p.m. The finished beer prepared from this prefiltration beer had a foam collapse time of 7 minutes 30 seconds. Finished beer prepared from prefiltration beer D to which no phosphorylated mannan was added had a foam collapse time of 5 minutes 45 seconds.

I claim:

1. The method of increasing the foam life of carbonated alcoholic malt beverages which comprises dissolving therein phosphorylated mannan.

2. The method of increasing the foam life of carbonated alcoholic malt beverages which comprises dissolving therein from about 5 to about 320 parts per million by weight of phosphorylated mannan.

3. The method of increasing the foam life of carbonated alcoholic malt beverages which comprises dissolving therein from about 20 to about 80 parts per million by weight of phosphorylated mannan.

4. A normally foam producing carbonated alcoholic malt beverage including a foam life increasing amount of the microbial polysaccharide phosphorylated mannan dissolved therein.

5. Beer containing from about 20 to about 80 parts per million by weight of phosphorylated mannan.

6. A normally foam producing carbonated alcoholic malt beverage containing from about 5 to about 320 parts per million by weight of solid phosphorylated mannan dissolved therein.

No references cited.